United States Patent [11] 3,630,789

| [72] | Inventor | Alden J. Deyrup<br>West Chester, Pa. |
|---|---|---|
| [21] | Appl. No. | 25,235 |
| [22] | Filed | Apr. 2, 1970 |
| [45] | Patented | Dec. 28, 1971 |
| [73] | Assignee | E. I. du Pont de Nemours and Company<br>Wilmington, Del. |

[54] HEXAVALENT CHROMIUM/FUMARATE SOLUTIONS AND THE TREATMENT OF METAL SUBSTRATES THEREWITH
19 Claims, No Drawings

| [52] | U.S. Cl. | 148/6.2, 148/6.27 |
|---|---|---|
| [51] | Int. Cl. | C23f 7/26 |
| [50] | Field of Search | 148/6.2, 6.21, 6.27; 117/75, 49, 132; 156/3; 161/189, 216 |

[56] References Cited
UNITED STATES PATENTS

| 2,559,812 | 7/1951 | Watson | 148/6.2 |
|---|---|---|---|
| 2,902,390 | 9/1959 | Bell | 148/6.2 X |
| 3,202,551 | 8/1965 | Gerischer | 148/6.2 X |
| 3,382,081 | 5/1968 | Cutter et al. | 148/6.2 X |
| 3,466,207 | 9/1969 | Vincent et al. | 156/3 |
| 3,519,501 | 7/1970 | Holden et al. | 148/6.2 |

Primary Examiner—Ralph S. Kendall
Attorney—James A. Forstner

ABSTRACT: Aqueous solutions having a pH of 1.8 to 5.0 and containing about 0.00001 to 0.02 gram atom per liter of hexavalent chromium and 0.001 to 0.8 gram formula weight per liter of fumaric acid, and the use of such solutions for pretreating base metal substrates at a temperature of about 25° to 100° C. to improve the adhesive bonding to the base metal substrate of a subsequently applied organic polymer coating, particularly a coating of a thermoplastic polymer such as polyethylene. Preferably, the polymer that is bonded to the pretreated substrate has uniformly dispersed therein a finely divided alumina which has a specific surface area of at least 5 square meters per gram and which is substantially free of combined water.

3,630,789

HEXAVALENT CHROMIUM/FUMARATE SOLUTIONS AND THE TREATMENT OF METAL SUBSTRATES THEREWITH

CROSS-REFERENCE TO RELATED APPLICATION

My copending application, Ser. No. 25,234, filed Apr. 2, 1970, and entitled "Polymer Compositions Having Improved Adhesion To Substrates and Composite Articles Made Therefrom."

BACKGROUND

1. Field of the Invention

This invention relates to aqueous hexavalent chromium/fumaric acid solutions and to their use in the surface treatment of base metals, particularly for the purpose of improving the adhesive bonding to the treated metal surfaces of subsequently applied organic polymer coatings or laminar layers.

2. Prior Art

Various organic polymers such as the polyolefins are not well suited for use as structural adhesives, e.g., for joining metal parts, of for preparing durable protective or decorative coatings on metal substrates, because they are slow to develop suitable adhesion and/or because the adhesion obtained is not durable, particularly in the presence of moisture and conditions of stress. Thus, although they offer advantages of low cost and alternate advantages of strength, toughness and chemical inertness, the olefin polymers such as the polyethylenes and polypropylene are commonly known to adhere poorly to metals. Various other organic polymers have been found to have limited use as structural adhesives or as coatings for metal substrates because the adhesive bonds formed with the substrate are not as good as desired for many purposes.

It is well known to introduce carboxyl groups into polymers by grafting, copolymerization; etc., to improve their speed of adhesion, but this approach usually impairs physical strength and frequently worsens durability of the adhesive bond to such important reactive metals as steel, iron, copper, and the like. Various ways have been proposed for improving the adhesion of polyethylene to metals. Thus, Busse and Boxler, U.S. Pat. No. 2,838,437, propose incorporating in the polyethylene certain unsaturated acids, or treating the polyethylene surface or the surface to be adhered thereto with such acid; and Pines, U.S. Pat. No. 3,038,847, proposes applying prime coats of various aminoalkyl silicon compounds to metal surfaces prior to the application thereto of coatings of organic polymers. However, the improvements resulting from such proposals are usually improvements in the speed of the development of adhesion (generally indicated by increases in peel and lap shear strengths reported with respect to freshly prepared test specimens), without any significant improvement in the durability of adhesion under stress in the presence of moisture. In some cases, the proposals for improving peel strength result in a worsening of the durability of adhesion under stress in the presence of moisture. Since a structural adhesive must be able to sustain substantial continuing stress in a predictable and dependable way in our humid world environment, mere acceleration of adhesion, while useful, is often of limited practical value unless the problem of poor durability of adhesion is or can also be solved. Similarly, protective or decorative polymer coatings on corrodible metals such as iron or steel are of limited practical value if the physical forces of rust growth can push the coating away from a scratch or flaw and thereby spread corrosive failure of the coating.

Vincent, U.S. Pat. No. 3,466,207, proposes pretreating the surfaces of base metals at 40°–100° C., first with a 0.1 to 50 percent chromic acid solution, then with a 0.1–50 percent solution of an aliphatic carboxylic acid which may be fumaric acid but is preferably maleic acid, as a way of improving the bonding of organic plastic coatings to the metal surfaces. This patent, as well as an article by Vincent (Journal of Applied Science, Vol. 11, pages 1,553–1,562(1967)) describing the same two-step pretreating method, teaches rinsing the substrate between the two steps to prevent adhering $CrO_3$, used in the first step, from contaminating the organic acid solution used in the second step. While this pretreating method is effective in improving the adhesive bond between the polymer and the substrate, it suffers from the complexity of using two pretreating baths and in requiring the use of relatively concentrated and costly treating baths.

SUMMARY OF THE INVENTION

One embodiment of the invention is an aqueous solution useful as a base metal treating bath, which solution has a pH of 1.8 to 5.0 and contains from 0.00001 to 0.02 gram atom of hexavalent chromium per liter and from 0.001 to 0.8 gram formula weight of fumaric acid per liter.

Another embodiment of the invention is a method for treating a base metal substrate to which a coating of an organic polymer is to be subsequently applied to improve the adhesive bonding of the polymer coating to the substrate, which method involves contacting the base metal substrate at a temperature of about 25° to 100° C. with the above hexavalent chromium/fumarate solution, rinsing the treated substrate to remove therefrom all residues of the treating solution, then drying the substrate.

In a further embodiment of the invention, a base metal substrate is treated with the hexavalent chromium/fumaric acid solution as described above, following which an organic polymer is applied to the substrate to form a composite article comprising the substrate with a coating of the polymer adhesively bonded thereto, which polymer is applicable to the substrate in a nonaqueous form that will wet the substrate and is solid in its final applied form. Preferably, the polymer that is applied to the substrate has uniformly dispersed therein a finely divided calcined alumina having a specific surface area of at least 5 square meters per gram, and which is substantially free of combined water.

DETAILED DESCRIPTION AND PREFERRED EMBODIMENTS

The aqueous solution of the invention contains both hexavalent chromium and fumaric acid which may be present in part as fumarate anions. The preferred source of hexavalent chromium is chromium trioxide, $CrO_3$, although any water-soluble chromate or dichromate such as the ammonium and alkali metal chromates and dichromates, e.g., the ammonium, sodium and potassium chromates and dichromates, can be used in preparing the solution. The preferred source of fumarate anions is fumaric acid, although any compound which dissolves in water to yield fumaric acid and fumarate anions can be used, examples of such compounds being the water soluble salts of fumaric acid such as the ammonium and alkali metal fumarates.

The treating solution should have a pH from about 1.8 to 5.0, since at a pH lower than about 1.8 the useful life of the solution is poor due to the mutual destruction of the hexavalent chromium and fumaric acid which occurs at such high acidities. On the other hand, the pH of the solution should not be higher than about 5.0 since at such higher pH values the solution is relatively ineffective for treating base metals. Preferably, the solution will have a pH from about 2 to 4. pH values in the lower end of the 1.8 to 5.0 range can be attained by the acidity of the preferred solution components, chromium trioxide (chromic acid) and fumaric acid, alone. Other pH values in that range can be attained by the addition of suitable amounts of any basic compound which does not destroy or precipitate the hexavalent chromium or fumarate anion, examples of such compounds being the ammonium, sodium and potassium hydroxides, carbonates and bicarbonates, and the like. If the solution is prepared using, for example, sodium chromate and sodium fumarate, attainment of the desired pH may require suitable additions of a strong acid such as sulfuric or nitric acid.

The concentrations of hexavalent chromium and fumaric acid in the treating solution are of considerable importance, since if they are too high rapid mutual destruction of the hexavalent chromium and fumaric acid results, particularly when the solutions are employed at elevated temperatures. It has been discovered that such mutual destruction can be reasonably prevented with the attainment of useful solution life by employing hexavalent chromium concentrations not greater than about 0.02 g. atom per liter and fumaric acid concentrations not greater than about 0.8 gram formula weight per liter. On the other hand, in order for the treating solution to be significantly effective for treating a base metal, the concentrations of hexavalent chromium and fumaric acid, respectively, in the treating solution should generally be at least 0.00001 gram atom per liter and 0.001 gram formula weight per liter. Thus, the effective concentrations range from about 0.00001 to 0.02 gram atom of hexavalent chromium per liter and from about 0.001 to 0.8 gram formula weight of fumaric acid per liter. The preferred concentrations, respectively, range from 0.0001 to 0.01 gram atom per liter and from 0.01 to 0.2 gram formula weight per liter, respectively.

In using the above solution to treat a base metal substrate prior to the application thereto of an organic polymer for the purpose of improving the adhesive bonding of the polymer to the substrate, the substrate is contacted with the solution at a temperature of from about room temperature to the boiling temperature, e.g., about 25° to 100° C., for a contact time effective to improve the adhesive bond. Contact times from about 30 seconds to 20 minutes or longer are generally effective, although somewhat longer times are usually advisable at the lower of the above temperatures than at the higher temperature. The preferred temperatures are from about 70° to 100° C., at which temperatures contact times of from about 1 to 5 minutes are generally adequate.

The compatibility of hexavalent chromium and fumaric acid in the treating solution of the invention, particularly at the preferred treating temperatures of 70° to 100° C., is surprising since it would have been expected that they would mutually destroy each other. Thus, Vincent, U.S. Pat. No. 3,466,207, teaches against contaminating his carboxylic acid treating solution, which may be a fumaric acid solution, with chromic acid. Furthermore, if a solution is prepared containing both chromic acid ($CrO_3$) and fumaric acid at the chromic acid and carboxylic acid concentrations shown for the solutions of the examples of the above patent, mutual destruction of the chromic acid and fumaric acid does in fact occur. Thus, when 5 weight percent of fumaric acid was added to a 5 weight percent solution of chromic acid ($CrO_3$), and the temperature of the mixture was raised with stirring to dissolve the fumaric acid, the original clear orange color of the solution changed to a dark brown and gas evolution began before all of the fumaric acid had dissolved and at about 90° C. This illustrates the mutual destruction of these reagents expected by chemists when they are present in the same solution. In contrast, when a separate portion of the same 5 percent chromic acid solution was similarly heated in the absence of fumaric acid, its color remained a clear orange.

The substrates which can be effectively pretreated in accordance with this invention, prior to the bonding thereto of an organic polymer, are any of the base metals or alloys commonly used for structural purposes. Such metals are those which are no higher than magnesium in the electromotive series, including aluminum, iron, steel, stainless steel, copper, brass, titanium, magnesium, nickel, tin, tin plate, zinc and zinc plate. The generally preferred metal substrates are aluminum, iron, steel and copper.

The base metal substrate should be clean, i.e., free of dirt, oils, greases and the like, prior to treating the same with the above hexavalent chromium/fumaric acid solution. Generally, the substrate will be thoroughly polished and/or washed and/or degreased, then dried. Cleaning by use of a degreasing solvent such as trichloroethylene or perchloroethylene is generally preferred.

The treatment of the clean substrate with the hexavalent chromium/fumaric acid solution is preferably carried out by contacting the substrate with the solution for an effective period of time while maintaining the solution at the desired temperature. After such contact of the substrate with the treating solution, it is important that the substrate be thoroughly rinsed with water so as to remove from the substrate surfaces all unused residues of the treating solution, following which the treated substrate is dried. Although no visible etching of the substrate results from the treatment, the treated substrate has been found to adhere readily to subsequently applied organic polymer coatings or laminar layers and to form improved adhesive bonds therewith.

The above pretreatment of base metal substrates appears to yield at least some worthwhile improvement in the adhesive bonding of any subsequently applied organic polymer which is solid in its final applied form and which can be applied to the substrate in a nonaqueous form which will wet the substrate during application, e.g., in molten form, in solution in a volatile organic solvent or in plastic form. Among the many types of such polymers, the preferred polymers are the meltable or thermoplastic nonpolar or relatively nonpolar polymers such as the olefin hydrocarbon polymers, particularly the low and high density polyethylenes, polypropylenes, copolymers of two or more such olefins, and copolymers of olefins with vinyl esters, e.g., copolymers of ethylene with vinyl acetate. Others are the copolymers of tetrafluorethylene and hexafluoropropylene and the polycarbonates such as bisphenol. A polycarbonate (the polycarbonate of 4,4'-isopropylidene diphenol).

Preferably, the organic polymer that is applied to the pretreated substrate will have dispersed therein a small amount, generally about 0.4 to 10 percent, preferably 1 to 6 percent, based upon the polymer weight, of a finely divided alumina which has a specific surface area, as determined by the nitrogen adsorption (B.E.T.) described by F. M. Nelson and F. T. Eggertsen, Analytical Chemistry, Vol. 30, pp. 1,387–1,390, (1958), of at least 5 square meters and preferably 15 to 700 or more square meters per gram, and which contains no combined water, or at most, no more tan 9 percent by weight thereof. Such aluminas, hereinafter sometimes referred to simply as "high surface aluminas" or more simply as "HS aluminas," usually are obtained by heating or calcining at a temperature of about 400° to 1,100° C., preferably 450° to 1,000° C., any of the materials commonly known or referred to as alumina, activated alumina, aluminum hydrate or hydroxide, etc., lying in composition between $Al(OH)_3$ and $Al_2O_3$, for a time effective to increase its specific surface area to a value of at least 5 square meters per gram, while practically eliminating combined water. In order to facilitate uniform dispersal of the HS alumina in the polymer, the alumina should generally be in the form of particles, or aggregates of particles, no larger in average size than 10 microns, the preferred sizes ranging from about 0.2 to 2 microns. When the organic polymer is to have a high surface alumina dispersed therein, the polymer should of course be one which is stable in the presence of the alumina.

Such polymers having a HS alumina dispersed therein and their use in forming composite articles comprising a base metal substrate having the polymer/HS alumina composition adhesively bonded thereto are disclosed and claimed in my above-mentioned copending application Ser. No. 25,234. They can be applied to the base metal substrate which has been pretreated in accordance with the present invention by any nonaqueous method which will cause the polymer to wet the surface of the substrate. During application, the polymer composition should be in a liquid or plastic flow condition to assure wetting of the substrate. Thus, the composition can be applied while the polymer component is in a molten state, or while it is dissolved in a volatile organic solvent, or while the composition is in a plastic state due to the use of temperatures high enough to make the composition plastic, i.e., flow under pressure. In most instances, the polymer component of the composition will be a thermoplastic polymer which is solid at ordinary temperatures but is liquid (molten or dissolved in or softened by a volatile organic solvent) or plastic at the temperature of application which generally will be a temperature above normal temperatures.

The beneficial effect derived from the pretreatment of the base metal substrate with the hexavalent chromium/fumaric acid solution of the invention may be an improvement in either the speed of adhesion of the subsequently applied polymer coating or in the durability of the resulting adhesive bond, or both. For uses where structural stress is involved, particularly in the presence of moisture, improvements in both are most desirable. Improvements both in speed of adhesion and in the durability of the adhesive bond are best realized when the polymer that is applied to the pretreated metal substrate is one which has dispersed therein a small amount of HS alumina as described above.

The invention is illustrated by the following examples in which all amounts and concentrations expressed as percentages are by weight. In those examples in which a polymer having a high surface alumina dispersed therein was used, the HS alumina so dispersed had a specific surface area as determined by the B.E.T. nitrogen adsorption method, of 17 square meters per gram and an average particle size of less than 5 microns. Its water content was less than 1 percent by weight. It was prepared by dry milling a 100 mesh (U.S. sieve scale) commercial alumina, designated by the manufacturer as Alcoa Activated Alumina F1, in a porcelain ball mill for 24 hours, then calcining the milled product at 1,000° C. for 2 hours. Following cooling to room temperature, the calcined material was preserved in a sealed container until used, when it was then dispersed in melted polymer on a rubber mill.

EXAMPLE 1

A water solution containing 0.01 percent $CrO_3$ (chromic acid) and 0.1 fumaric acid (and thus containing the equivalent of 0.001 gram atom of chromium and 0.009 gram formula weight of fumaric acid per liter) was prepared and heated for 24 hours at 85° C. The original clear yellow color of the solution remained during the entire heating period, with no indication of the formation of any chromium (III) colors os insoluble compounds being evident. The unexpected stability of the chromic acid and fumaric acid in the presence of each other was clearly evident. The solution was highly effective for pretreating base metal substrates to improve the adhesive bonding of subsequently applied polyethylene and similar polymer coatings.

EXAMPLE 2

Three water solutions were prepared: the first solution (A) contained 0.1 percent (0.01 gram atom of chromium/l.) chromic acid ($CrO_3$); the second (B) contained 0.1 percent (0.009 gram formula weight/l.) of fumaric acid; and the third (C) contained both 0.1 percent chromic acid and 0.1 percent fumaric acid and had a pH of 2.3.

Clean 5-mil aluminum foils were separately treated by immersion in the above solutions as follows:

Treatment 1—In solution A at 80° C. for 5 minutes, then thoroughly rinsed and dried.

Treatment 2—In solution B at 60° C. for 5 minutes, then thoroughly rinsed and dried.

Treatment 3—In solution A at 80° C. for 5 minutes, then thoroughly rinsed, then in solution B at 60° C. for 5 minutes, then thoroughly rinsed and dried.

Treatment 4—In solution C at 80° C. for 5 minutes, then thoroughly rinsed and dried.

Treatment 5—None (control).

Pure linear polyethylene, melt index 3.0, (in the form of sheets 50 mils thick) was applied to the treated aluminum foils to take peel test specimens representing each of the above treatments. The test specimens were pressed to an adhesive glue-line thickness of 5 mils at 150° C. for 5 minutes, then quenched in cold water. The resulting laminates were cut into strips and pulled apart at a rate of 0.1 inch per min. The peel strengths (peeling force in pounds divided by the strip width in inches) found were as follows:

| Treatment | Peel Strength, lbs./in. |
|---|---|
| 1—chromic acid | 2 |
| 2—fumaric acid | 0.2 |
| 3—chromic acid, then fumaric acid | 12 |
| 4—chromic acid, plus fumaric acid | 12 |
| 5—none (control) | 0 |

EXAMPLE 3

The procedure of example 2 was repeated except that the polyethylene used as the adhesive had dispersed therein 5 percent HS alumina, based upon the weight of the polyethylene. The peel strengths found were as follows:

| Treatment | Peel Strength, lbs./in. |
|---|---|
| 1—chromic acid | 19 |
| 2—fumaric acid | 1 |
| 3—chromic acid, then fumaric acid | 35 |
| 4—chromic acid, plus fumaric acid | 35 |
| 5—none (control) | 1 |

EXAMPLE 4

Butt tensile test units were made using clean polished aluminum sheet parts cemented together with an adhesive which was a pure linear polyethylene, melt index 3.0, having dispersed therein 5 percent HS alumina. Similar test units were made using the same polyethylene without the dispersed alumina. The test unit cross-sectional areas were all identical, i.e., 2 inches long in total and only 0.021 inch wide, and so chosen as to accelerate the diffusion of water without altering its ultimate equilibrium. The glue-line thickness of the adhesive at the joints of the test units was controlled to be 1 mil.

The aluminum test unit parts were treated, before assembly with the polyethylene adhesives, by the treatments described in example 2. The parts were then assembled with the adhesives and the assemblies were baked at 175° C. for 30 minutes, allowed to cool, and then were placed under a steady tensile stress at 2,000 lbs./sq. in. of joint cross-sectional area while immersed in water. The times to failure of the joint bonds were as follows:

Time to Failure, Hours

| Treatment | Adhesive without HS Alumina | Adhesive with HS Alumina |
|---|---|---|
| 1—chromic acid | — | 32 |
| 2—fumaric acid | — | 887 |
| 3—chromic acid, then fumaric acid | 37 | 1,577 |
| 4—chromic acid, plus fumaric acid | 40 | 1,479 |
| 5—none (control) | — | — |

The above data illustrates the great improvement in the durability of the adhesive bond under stress in the presence of water resulting from the combination of using an adhesive containing the dispersed HS alumina together with either the two-step pretreatment of the metal parts (treatment 3) or the simpler one-step pretreatment of the present invention (treatment 4).

Example 5

Butt tensile test units similar to those of example 4 were prepared using copper unit parts and mild steel unit parts. All of the metal unit parts were treated for 5 minutes at 80°–90° C. in a bath consisting of water in which has been dissolved 1.66 percent fumaric acid (0.14 gram formula weight/l.), 0.6 percent sodium bicarbonate and 0.14 percent potassium chromate, $K_2CrO_4$ (0.007 gram atom of chromium/l.). The solution had a pH of 3. The unit parts were bonded together at 170° C. with the HS alumina-bearing polyethylene adhesive of example 4. The test units were then placed under a steady tensile stress at 2,000 lbs./sq. in. while immersed in water for a test period of 200 hours. No failure of the joint bonds occurred.

EXAMPLE 6

An aqueous solution was prepared containing 0.5 g./liter of chromic acid ($CrO_3$) and 5 g./liter of fumaric acid. To this was added enough sodium bicarbonate to raise the pH of the solution to 2.7. Degreased 5-mil aluminum foils were treated in the solution by immersion at 95° C. for 5 minutes, followed by thorough rinsing and drying. Other degreased 5-mil aluminum foils not treated were used for comparison. Peel test specimens were made with these treated and untreated foils in the manner of example 2, except that the adhesives used were polypropylene; and ethylene/vinyl acetate copolymer (E/VA) containing 18 percent vinyl acetate; a copolymer of tetrafluoroethylene and hexafluoropropylene (FEP); and a polycarbonate of 4,4'-isopropylidene diphenol, each having dispersed therein 5 percent of the HS alumina. The test specimens were assembled by pressing together for 5 minutes at temperatures suitably chosen to melt the adhesives. The peel strengths found were as follows:

| Adhesive | Application temp. of adhesive, °C. | Peel strength, lbs./in. On untreated metal | Peel strength, lbs./in. On Treated metal |
|---|---|---|---|
| Polypropylene | 185 | 0 | 9.5 |
| E/VA | 170 | 11 | 70+ |
| FEP | 200–300 | 0.4 | 11 |
| Polycarbonate | 250 | 0.9 | 2 |

I claim:

1. An aqueous solution usable for treating a base metal substrate prior to the application to the substrate of an organic polymer coating to improve the bonding of said coating to said substrate, said solution having a pH of about 1.8 to 5.0 and having dissolved therein hexavalent chromium at a concentration of about 0.00001 to 0.02 gram atom per liter and fumaric acid at a concentration of about 0.001 to 0.8 gram formula weight per liter.

2. A solution according to claim 1 in which the concentration of hexavalent chromium is from 0.0001 to 0.01 gram atom per liter and the concentration of fumaric acid is from 0.01 to 0.2 gram formula weight per liter.

3. A solution in accordance with claim 1 whose pH is 2 to 4.

4. A solution in accordance with claim 1 whose pH is 2 to 4 and in which the concentration of hexavalent chromium is 0.0001 to 0.01 gram atom per liter and the concentration of fumaric acid is 0.01 to 0.2 gram formula weight per liter.

5. A solution according to claim 4 in which the source of the hexavalent chromium is chromic acid.

6. A method of treating a base metal substrate preparatory to the application thereto of a coating of an organic polymer, for the purpose of improving the bonding of said coating to said substrate, said method comprising treating said substrate by contacting the same at a temperature of about 25° to 100° C. with the solution of claim 1, rinsing the substrate with water to remove therefrom all residues of said solution, then drying the substrate.

7. The method of claim 6 wherein the substrate is contacted with the treating solution at a temperature of about 70° to 100° C.

8. The method of claim 7 employing as the treating solution an aqueous solution having a ph of 2 to 4 and having dissolved therein hexavalent chromium at a concentration of 0.0001 to 0.01 gram atom per liter and fumaric acid at a concentration of 0.01 to 0.2 gram formula weight per liter.

9. The method of claim 7 employing a solution which contains chromic acid as the source of the hexavalent chromium.

10. The method of claim 6 employing aluminum as the base metal.

11. The method of claim 6 employing copper as the base metal.

12. The method of claim 6 employing steel as the base metal.

13. The method of preparing a composite article comprising a base metal substrate having an organic polymer adhesively bonded thereto, said method comprising treating said metal substrate according to the method of claim 6, then applying said organic coating to the substrate.

14. The method of claim 13 wherein the organic polymer has uniformly dispersed therein about 0.4 to 10 percent based upon the polymer weight, of a finely divided alumina having a specific surface area of at least 5 square meters per gram and being practically free of combined water.

15. The method of claim 13, wherein the polymer is polyethylene.

16. The method of claim 14, wherein the polymer is polyethylene.

17. The method of claim 14, wherein the polymer is polypropylene.

18. The method of claim 14, wherein the polymer is a copolymer of ethylene and vinyl acetate.

19. The method of claim 14, wherein the polymer is a copolymer of tetrafluorethylene and hexafluoropropylene.

* * * * *